United States Patent [19]

Olsen

[11] Patent Number: 4,949,828

[45] Date of Patent: * Aug. 21, 1990

[54] APPARATUS AND METHOD FOR SENSING CLUTCH SLIPPAGE

[75] Inventor: Robert A. Olsen, Janesville, Wis.

[73] Assignee: Dana Corporation, Toledo, Ohio

[*] Notice: The portion of the term of this patent subsequent to Jan. 7, 2005 has been disclaimed.

[21] Appl. No.: 260,913

[22] Filed: Oct. 21, 1988

[51] Int. Cl.$^5$ .............................................. F16D 27/02
[52] U.S. Cl. .............................. 192/84 R; 192/84 C; 361/31
[58] Field of Search ............... 192/84 R, 84 C, 103 R, 192/150; 307/10.1; 361/187, 31

[56] References Cited

U.S. PATENT DOCUMENTS

| | | | |
|---|---|---|---|
| 4,340,133 | 7/1982 | Blersch | 192/56 R |
| 4,572,343 | 2/1986 | Boffelli | 192/56 R |
| 4,627,525 | 12/1986 | Geldec | 192/84 C |
| 4,749,073 | 6/1988 | Olsen | 192/52 |

Primary Examiner—Rodney H. Bonck
Assistant Examiner—Andrea Pitts
Attorney, Agent, or Firm—Leydig, Voit & Mayer

[57] ABSTRACT

A soft start electromagnetic coupling has a driven member and a driving member that are coupled together in response to a magnetic flux produced by a direct current flow through a winding on the clutch. When the members are coupled by an electromagnetic flux, they may slip relative to reach other during starting, when the load on the coupling changes or when the accessory driven by the coupling freezes or becomes jammed. Relative slippage of the members produces an alternating current component in the direct current flow that is detected to indicate the slippage. The presence of an alternating current component can be sensed through a rectifier or frequency filter. Preferably, the presence of a persistent alternating current component causes a switch to open, interrupting the flow of direct current to the coupling. Interruption of the current flow disengages the coupling and prevents damage to other accessories that may be driven by the same endless belt and to the belt that engages the driven member of the coupling.

23 Claims, 11 Drawing Sheets

APPARATUS AND METHOD FOR SENSING CLUTCH SLIPPAGE

FIELD OF THE INVENTION

This invention relates generally to an electromagnetic coupling and, more particularly, to an electromagnetic coupling in which slippage between coupling members can easily be sensed.

BACKGROUND OF THE INVENTION

Electromagnetic couplings and clutches are well known. In one application, electromagnetic clutches are employed with a belt driven pulley in motor vehicles to drive accessory equipment when the clutch is engaged. A typical application is an air conditioner compressor that is periodically operated in response to air conditioning controls.

Generally, a single belt driven by a vehicle engine is trained over several pulleys to drive a number of accessories, some of which may employ a clutch for occasional operation. If one of the accessories employing a clutch should become jammed or otherwise malfunction so that its shaft does not rotate, the belt and the other accessories driven by the same belt may be adversely affected and ultimately fail. To avoid those failures, it is desirable to detect clutch slippage.

A particularly useful electromagnetic clutch employs a "soft start" that gradually brings an accessory up to full rotational speed and avoids an abrupt engagement. One clutch of that type is described in commonly assigned U.S. Pat. No. 4,749,073 to Olsen, the disclosure of which is incorporated herein by reference.

An apparatus for sensing slippage in an electromagnetic clutch is disclosed in U.S. Pat. No. 4,627,525 to Geldec. The Geldec apparatus constantly generates a pulse train or alternating current signal, the frequency of which is monitored. Changes in the monitored pulse frequency indicate speed changes that are related to clutch slippage. The Geldec apparatus requires a frequency counter and frequency discrimination circuitry, making it expensive and complex. Accordingly, it is desirable to provide an apparatus and method for detecting slippage in an electromagnetic clutch that is simple and inexpensive.

Another apparatus for sensing slippage in an electromagnetic clutch is disclosed in U.S. Pat. No. 4,572,343 to Boffelli. That clutch is intended for use with power take-offs on farm tractors. The clutch includes a rotor and an armature containing radial notches and slots, respectively. When the engaged clutch slips, the notches and slots rotate relative to each other, producing variable magnetic reluctance paths. The flux produced by a winding that engages the clutch varies in response to the variable reluctance paths. The varying flux is detected to indicate clutch slippage.

SUMMARY OF THE INVENTION

The general aim of the invention is achieved in a soft start electromagnetic coupling including members that engage gradually and eventually reach a high torque engagement in response to a magnetic field. The magnetic field that brings about the engagement is generated by a direct electrical current. When the coupling initially engages or the load driven by the coupling changes, the coupling members slip relative to each other. That slippage results in a ripple current, i.e., an alternating current, component that appears in the direct current supplied to the coupling. In the novel apparatus, the presence of that alternating current component is detected to indicate slippage. When sufficient slippage is detected, the coupling may be disengaged to prevent damage to the driving belt, to the overloaded accessory, and to other accessories driven by the same belt.

The presence of an alternating current component in the direct current can be readily detected with simple circuitry, such as a diode or a frequency-sensitive filter, making the novel apparatus inexpensive and reliable.

According to another aspect of the invention, a method is provided for detecting coupling slippage. In the novel method, the electrical current applied to the electromagnetic coupling to engage it is monitored for the presence of an alternating current component that indicates slippage. In both the novel apparatus and method, the presence of an alternating current component in the direct current may be ignored during a soft start, when the coupling first becomes engaged, and during short term load changes. In these situations, there is some short term slippage that produces an alternating current component in the direct current.

The advantages and some examples of the invention are more easily understood from the following detailed description when taken in conjunction with the accompanying drawings. Like elements are given the same reference numbers in all figures.

DETAILED DESCRIPTION OF PREFERRED EMBODIMENTS

The invention is particularly useful with, but not limited to, a "soft start" electromagnetic coupling. Accordingly, particular embodiments of the invention are described with reference to electromagnetic coupling structures of the type described in U.S. Pat. No. 4,749,073. An embodiment of that structure is described below with reference to FIGS. 1–5.

Figure 1:
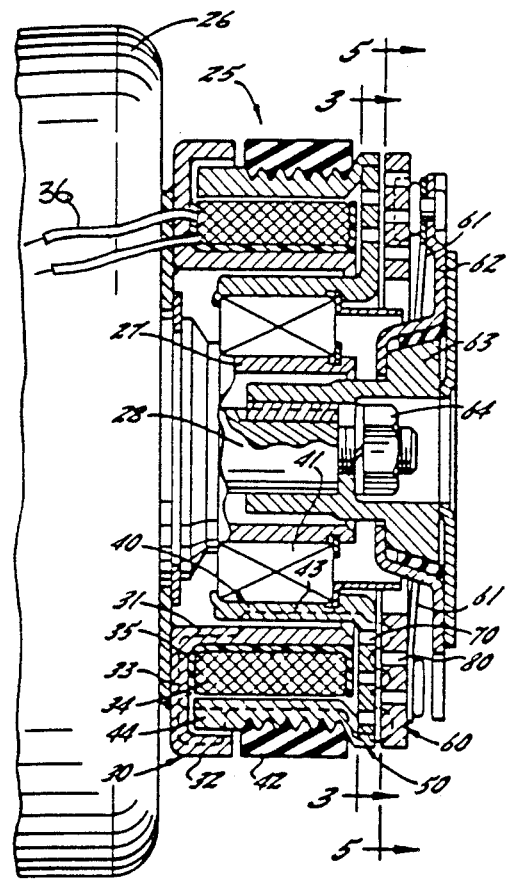
FIG. 1 is a sectional view of an electromagnetic coupling of the type useful in the present invention.
Figure 2:
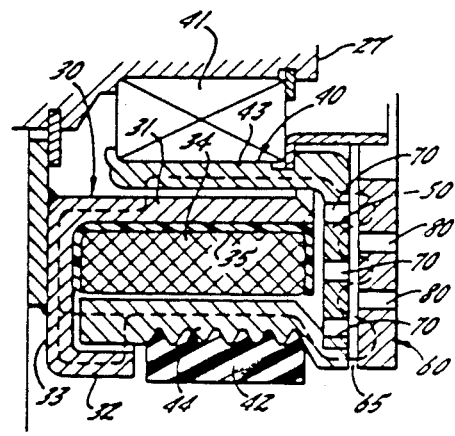
FIG. 2 is an enlarged view of a portion of FIG. 1.

An electromagnetic coupling 25, shown in FIG. 1, could be a brake but in this example is an electromagnetic clutch. Solely for convenience of illustration, clutch 25 has been shown in conjunction with a vehicular accessory 26, such as an air conditioning compressor, having a tubular nose 27 for mounting the clutch and a drive shaft 28 that extends through the nose.

Clutch 25 includes an electromagnet which is formed in part by a fixed annular magnetic core 30 having a substantially J-shaped radial cross-section. The core includes an inner pole ring 31 and an outer pole ring 32. A bridge 33 formed integrally with and extending radially between the rear ends of the pole rings is rigidly fastened to the front end of accessory 26. A multiple turn winding 34 is secured within a U-shaped channel 35 that is fastened to the outer side of inner pole ring 31. A pair of electrical leads 36 extend from winding 34 for supplying electrical current to the winding for generating a magnetic field.

An annular rotor 40 is rotatably journalled on nose 27 of accessory 26 through a bearing 41 and is driven by an endless belt 42 that engages another pulley on a vehicular engine (neither of which are shown). The rotor is substantially U-shaped in cross-section and includes inner and outer concentric annular pole pieces 43 and 44, the inner pole piece being secured to the outer race of bearing 41. Inner pole piece 43 of rotor 40 is spaced inwardly from the inner pole ring 31 of magnet core 30 while outer pole piece 44 is located between and spaced from winding 34 and outer pole ring 32. Several axially spaced grooves extend circumferentially around the outer side of outer pole piece 44 to engage complementary ribs on the inner side of drive belt 42.

An annular and circular disc-like member 50 is integrally formed with the forward end of inner pole piece 43 and extends radially toward outer pole piece 44. This member, which is also referred to as rotor disc 50, is rigidly joined to outer pole piece 44.

Another annular and circular disc-like rotary member 60 which constitutes the armature of clutch 25 is located in face-to-face opposing relationship with rotor disc 50. Three leaf springs 61 are spaced angularly around and extend generally radially along armature 60. One end of each spring 61 is connected to the armature while the opposite end is coupled to an annular bumper plate 62. Bumper plate 62 rotates with a hub 63 which, in turn, is keyed rigidly to shaft 28, the hub being held in an axially fixed position on the shaft by a nut 64.

Springs 61 couple armature 60 for rotation in unison with bumper plate 62 and hub 63 and urge the armature away from rotor disc 50. When winding 34 is not excited, a relatively narrow axial air gap 65 exists between rotor disc 50 and armature disc 60 so that they turn freely relative to each other; that is, clutch 25 is disengaged and, thus, belt 42 may turn rotor 40 without the transmission of torque from rotor 40 to armature 60 or shaft 28.

Core 30, rotor 40, and armature 60 are all made of a relatively low magnetic reluctance material, such as steel. When winding 34 is excited by a current flowing through leads 36, a magnetic flux is produced that travels along a path extending through core 30, rotor 40, and armature 60. The flux path is indicated by the dashed line in FIG. 2. In general, the flux passes along a circuit extending from inner pole ring 31 to inner pole piece 43, across air gap 65 to armature 60, back across the air gap to outer pole piece 44, to outer pole ring 32 and bridge 31 of core 33, and then back to inner pole ring 31. The flux magnetically attracts armature 60 into engagement with rotor disc 50, coupling the discs to transmit torque to armature disc 60, thereby turning shaft 28.

In conventional electromagnetic clutches, rotor and armature discs 50 and 60 have regions of relatively high magnetic reluctance in order to force the magnetic flux to zig-zag back and forth several times across air gap 65 between the two discs. That structure produces multiple magnetic poles. The novel clutch described in U.S. Pat. No. 4,749,073 includes uniquely shaped and located relatively high magnetic reluctance regions. Those regions are at least partially circumferentially shaped. As a result, opposing high reluctance regions in the two discs move from less nearly radially aligned positions to more nearly radially aligned positions and then back to the former, less nearly aligned positions as one disc rotates relative to the other. Because of this construction, the effective strength of the flux field across air gap 65 first decreases and then increases during relative rotation of the discs through 360 degrees or less. The varying flux field reduces the average torque transmitted from the driving member (i.e., rotor disc 50) to the driven member (i.e., armature disc 60) during initial engagement. As a result of that reduction, the initial engagement is gradual, producing a "soft start".

Figure 4:
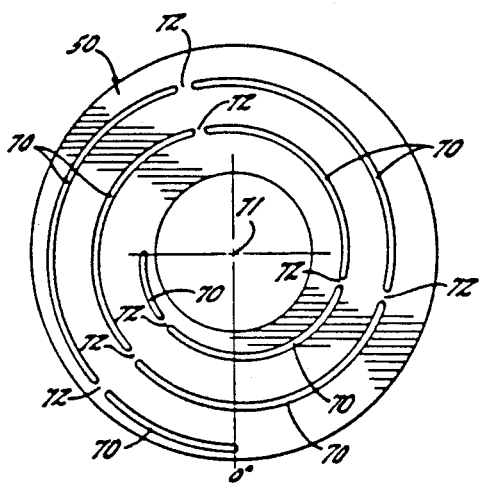
FIG. 4 is an elevational and partially schematic view of one of the disc-like members shown in FIG. 1.
Figure 5:
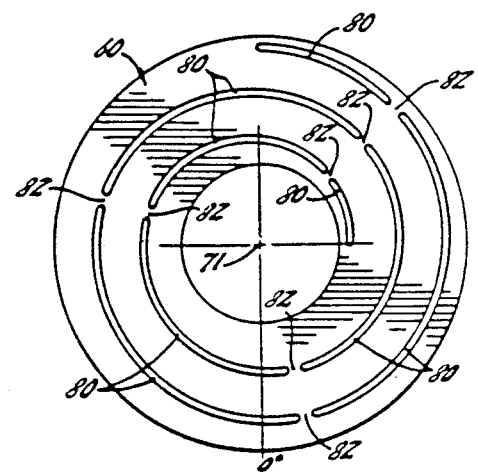
FIG. 5 is a partially schematic view taken substantially along line 5—5 of FIG. 1.

An example of one structure for a pair of rotor and armature discs that is described in U.S. Pat. No. 4,749,073 is illustrated in FIGS. 4 and 5. In FIG. 4, an embodiment of a rotor disc 50 includes relatively high reluctance regions 70 formed by slotting or grooving disc 50 and filling the slots or grooves with a material, such as copper or aluminum, that has a relatively high magnetic reluctance. As illustrated, however, high magnetic reluctance regions 70 are formed by cutting slots entirely through the disc and employing the air-filled slots as the high reluctance regions. Slots 70 in FIG. 4 correspond to a multiple turn spiral having its center at the central axis 71 of disc 50, the axis of rotation of shaft 28. The continuity of the spiral is interrupted by angularly spaced radial webs 72 of low magnetic reluctance. Webs 72 are part of disc 50 and are necessary to give the rotor mechanical strength. Webs 72 are spaced angularly from each other by 120 degrees in FIG. 4.

In some embodiments of clutch 25, armature disc 60 has high reluctance regions that are precisely identical in size, shape, and location to the high reluctance region 70 of rotor disc 50. An example is shown in FIG. 5 of an armature disc 80 for use with rotor disc 50. Armature disc 80 includes spiral slots made discontinuous by webs 82 that are spaced 120 degrees apart on the disc. The spiral high reluctance regions of discs 50 and 60 comprise both circumferential and radial components. The circumferential components provide the soft start characteristic.

Figure 3:
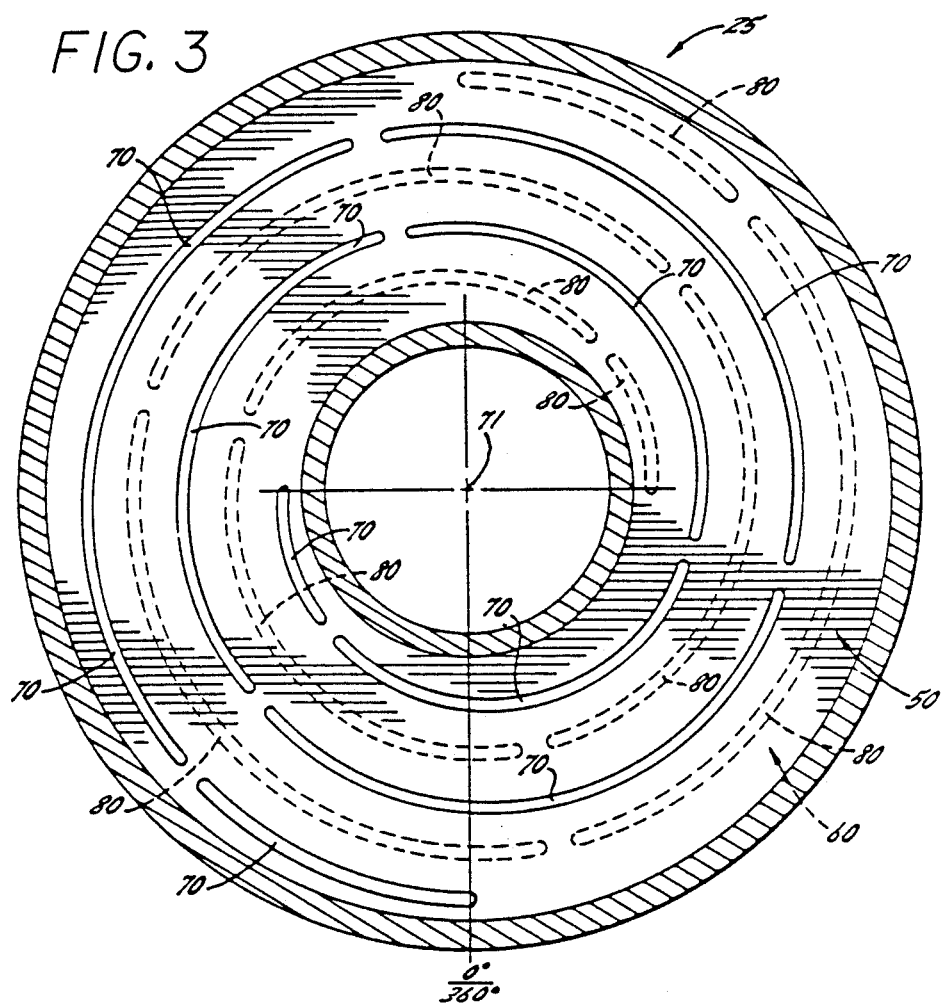
FIG. 3 is an enlarged schematic cross-sectional view taken substantially along line 3—3 of FIG. 1.

To understand the operation of the soft start clutch, FIG. 3 shows rotor disc 50 and armature disc 60 superimposed and 180 degrees out of phase. The armature disc slots 80 are indicated by the broken lines. In the alignment shown, slots 70 of the rotor disc and slots 80 in the armature disc are radially spaced by the maximum possible and substantially equal distances. Thus, in the relative positions shown in FIG. 3, there is a maximum radial mismatch between slots 70 and 80. As a result, the flux passing from inner pole piece 43 crosses from rotor disc 50 axially across air gap 65 to armature disc 60. The high reluctance barriers established by slots 70 and 80 prevent the flux from passing radially through the slots and force a zig-zag flux path. In the illustrated structure, the flux traverses low reluctance annular magnetic poles of substantially equal radial width each time the flux passes radially before crossing the air gap axially. This passage produces a substantially constant flux density at the interface between rotor and armature discs 50 and 60 and causes the rotor disc to transmit maximum torque to the armature disc.

When rotor disc 50 turns 90 degrees in a clock-wise direction relative to armature disc 60, the radial spacing between the rotor and armature slots decreases significantly. The low reluctance magnetic poles between adjacent slots are no longer of substantially equal radial width. When the flux passes in its zig-zag path, because of the varying radial width of the different poles, the flux density is no longer substantially uniform. The flux saturates the narrower poles but not the wider poles. As a result, less torque is transmitted from the rotor disc to the armature disc.

Similarly, when the discs have rotated 180 degrees relative to each other from the position shown in FIG. 3, the two spiral grooves come into phase with each other. In that in-phase condition, the flux path is broken because the magnetic flux cannot cross the high reluctance barriers comprising the directly opposing slots 70 and 80. Under those conditions, zero or substantially zero torque is transmitted from the rotor disc to the armature disc.

When rotor disc 50 has rotated 270 degrees relative to armature disc 60 from the position shown in FIG. 3, magnetic poles of varying radial width are again established between slots 70 and 80. Magnetic flux zig-zags back and forth between the poles across air gap 65. As the rotor disc turns progressively through the positions described relative to the armature disc, the amount of torque transmitted decreases from a maximum to a zero or near zero minimum and then increases back to the maximum again as the match or mismatch of the spirals changes.

Because of the varying torque transmission with the relative angular positions of discs 50 and 60, when armature disc 60 is first axially attracted into engagement with rotor disc 50, there is slippage between them. At the relative position giving maximum torque transfer, the load is turned strongly. At the opposite position of zero torque transfer, one disc rotates relative to the other. As a result of the variation in torque transmitted between maximum and minimum values, the load is given a series of "pushes" that gradually accelerate shaft 28 to a constant speed. The average torque transmitted during slippage is lower than that of a conventional, fully engaged clutch. The torque variation causes the load driven by the armature disc to be brought up to its steady state rotational speed over a longer period of time than is the case with a conventional clutch. Thus, the clutch described gradually engages with a soft start rather than fully engaging abruptly or in a matter of milliseconds, as is the case with a conventional clutch. The soft start significantly reduces the likelihood of belt squeal, belt damage or breakage, engine slow down, and shaft damage. This desirable result is achieved through the electromechanical structure of the clutch without the need of specialized electronic controls that vary the magnitude of the current flowing through leads 36 to winding 34 to achieve a particular load acceleration characteristic.

The relative slippage of the rotor and armature discs results in alternating forward and reverse current surges in winding 34. The surges occur as engagement occurs, is lost, and is then regained. Those surges are an alternating current component that modulates the constant direct current that is applied to winding 34. The frequency of that alternating current component is the product of the number of flux increase/decrease cycles per revolution of the discs and the slip frequency of the discs.

When rotor disc 50 and armature disc 60 fully engage and slippage ends, the two discs assume such fixed relative angular positions with respect to each other as are necessary to transmit the torque required to turn shaft 28 at constant speed. If the load demands the full torque capability of clutch 25, the discs take a locked relative position for transmitting maximum torque as shown in FIG. 3. If less than the full torque is required to drive the load, the discs lock into a relative angular position different from that shown in FIG. 3. Thus, clutch 25 is capable of transmitting a relatively high torque once full engagement has occurred.

As described in U.S. Pat. No. 4,749,073, a soft start clutch can employ other locations and arrangements of the relatively high reluctance regions including or consisting of circumferential portions. Examples of alternative high reluctance region arrangements, in addition to those shown in U.S. Pat. No. 4,749,073, are shown in FIGS. 6–15.

Figure 6:
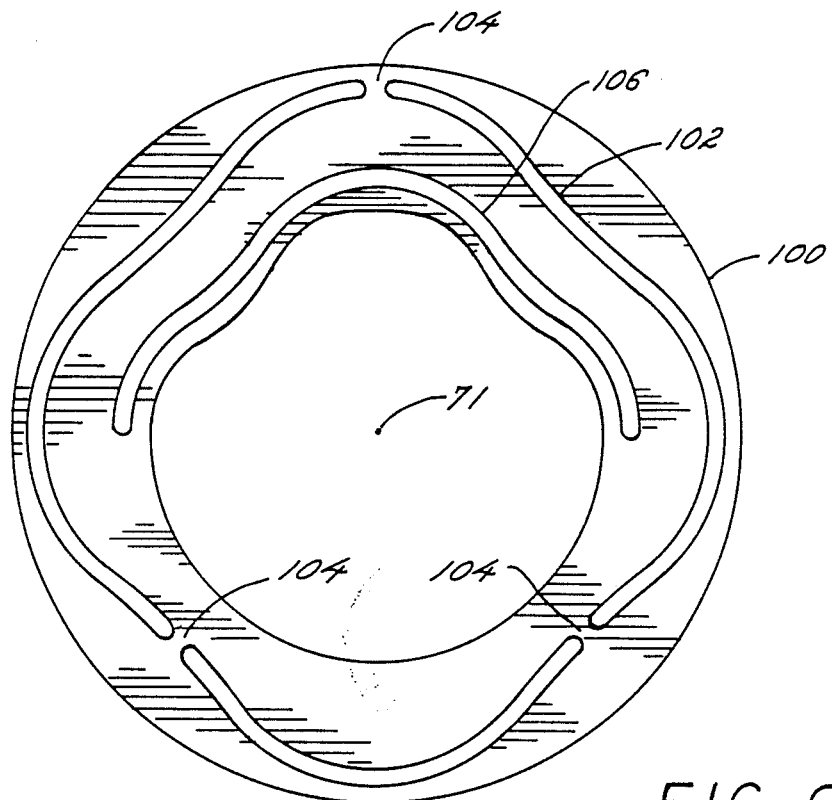
FIGS. 6 and 7 are elevational and partially schematic views of disc-like members that can be used together in a coupling of the type shown in FIG. 1.
Figure 7:
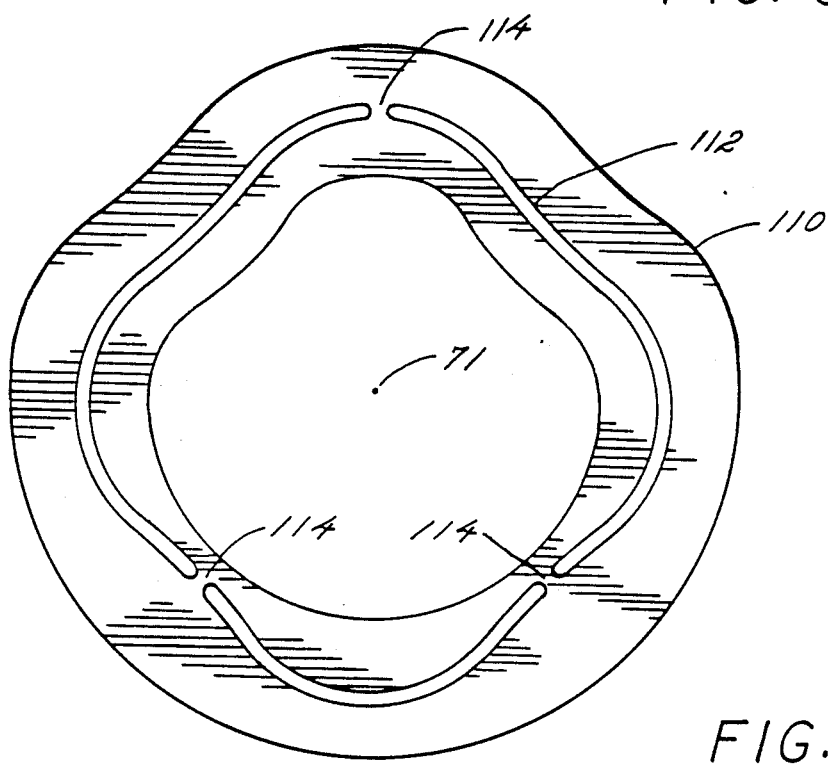

In FIG. 6, a rotor 100 includes a sinuous groove 102 lying near the periphery of the rotor body. Groove 102 includes three webs 104 symmetrically spaced around the rotor body to provide necessary mechanical support and stability. Groove 102 is generally sinusoidal in its shape approaching the outside of rotor 100 at each of four equally spaced points and diverging from that periphery at four other points, likewise equally spaced from each other. Rotor 100 also includes a second groove 106 disposed near the central mounting opening of the rotor. Groove 106 is also sinusoidal in shape but extends only over half the circumference of rotor 100. Rotor 100 may be used with armature 110 shown in FIG. 7. Armature 110 contains a sinusoidal groove 112 around its entire circumference. Groove 112 transverse includes three webs 114 to provide support and stability. When rotor 100 is superimposed on armature 110, groove 112 lies intermediate grooves 102 and 106. When rotor 100 turns relative to armature 110, the flux linkages between them change. These positional linkage changes produce the soft start and slippage under changing loads described above.

Figure 8:
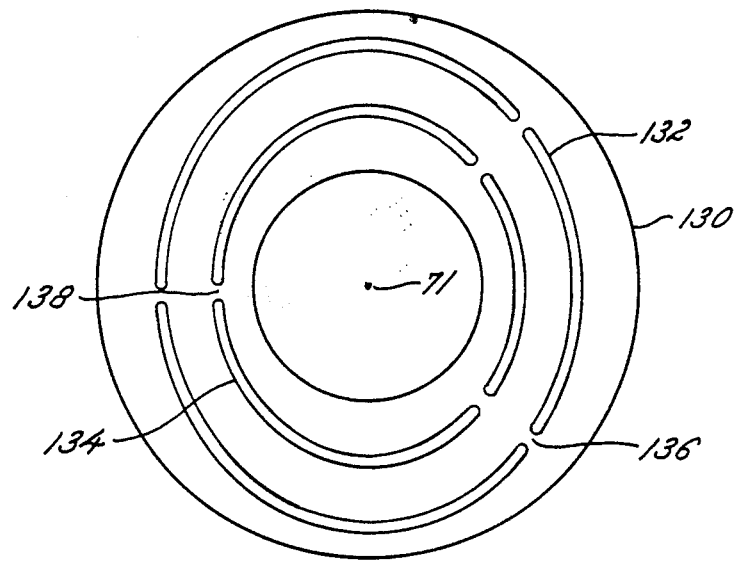
FIGS. 8 an 9 are elevational and partially schematic views of disc-like members that can be used together in a coupling of the type shown in FIG. 1.
Figure 9:
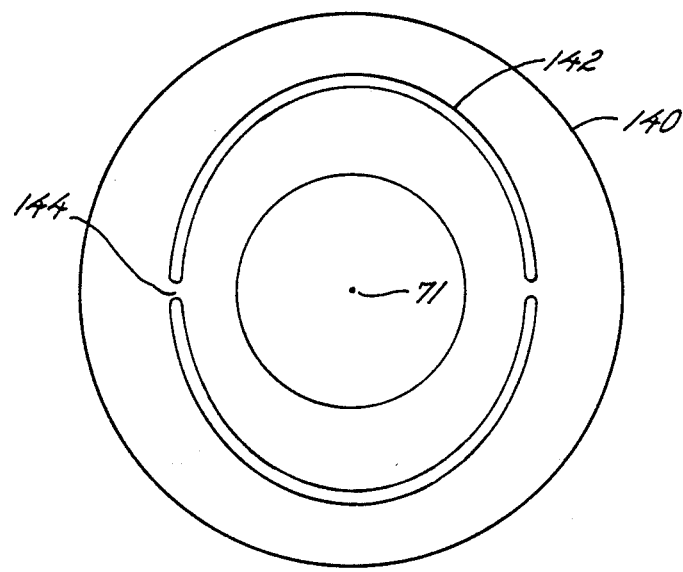

FIGS. 8 and 9 show another rotor and armature, respectively. In FIG. 8, a rotor 130 includes a generally elliptical groove 132 outwardly disposed with respect to center 71. (In all figures, center 71 represents a mounting center that coincides with the axis of rotation of shaft 28.) A second elliptical groove 134 is disposed in rotor 130 inwardly from elliptical groove 132. Grooves 132 and 134 each include three radial webs 136 and 138, respectively, to provide support to the rotor disc. An armature 140 in FIG. 9 includes an elliptical groove 142 having radial webs 144 providing mechanical support to the armature. When rotor 130 is superimposed on armature 140, groove 142 lies intermediate of grooves 132 and 134. Relative rotation of the rotor and armature changes the flux paths to produce the soft start and slippage already described for other clutch structures.

Figure 10:
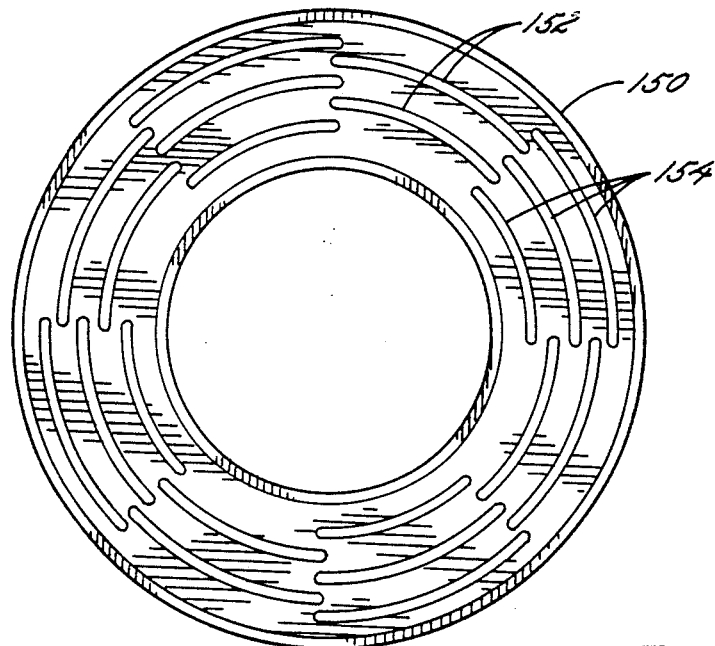
FIGS. 10 and 11 are elevational and partially schematic views of disc-like members that can be used together in a coupling of the type shown in FIG. 1.
Figure 11:
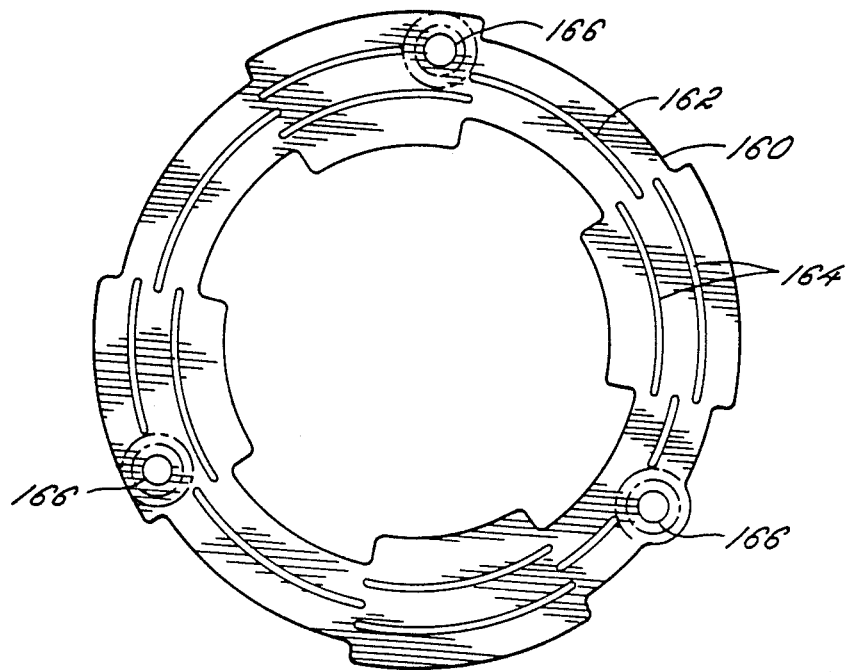

FIGS. 10 and 11 show still another rotor 150 and an armature 160 that are intended to be used together. Rotor 150 includes, in each of its quadrants, a pair of grooves 152 and a trio of grooves 153. Grooves 152 and 154 generally do not angularly overlap. The grooves shown are entirely circumferential in shape and the radii of grooves 152 are intermediate the radii of grooves 154. Armature 160 likewise includes grooves that subtend 45 degrees. In each quadrant of armature 160, a single circumferential groove 162 and a pair of circumferential grooves 164 are disposed side-by-side and do not overlap. The radius of the single groove 162 is chosen so that when the armature and rotor are superimposed, that groove lies intermediate of the two grooves in the pair 152. The pair of grooves 164 in each quadrant have radii that are chosen to lie between the radii of three grooves 154 of the rotor. Preferably, grooves 164 have the same radius as, and can overlie, grooves 152 of rotor 150. Likewise, preferably groove 162 has the same radius as the center groove of the trio of grooves 154. When the rotor and armature grooves are in phase, there is no torque transfer, as described with respect to the spirally grooved armature in FIGS. 3 and 4. Rotor 160 also includes three equally spaced mounting holes 166. Those holes 166 shorten or bisect certain of the grooves which has a slight effect on the torque transmission between the rotor and stator.

As in all of the rotor and armature structures of FIGS. 6-15, because of the circumferential shape of the grooves, the degree of flux linkage between rotor 150 and armature 160 depends on the relative angular positions of the rotor and armature. That angular dependence provides a soft start and generates an alternating current component in the direct current used to engage the clutch during starting, load changes, and with a blocked rotor. That alternating current component is sensed to obtain an indication of slippage.

Figure 12:
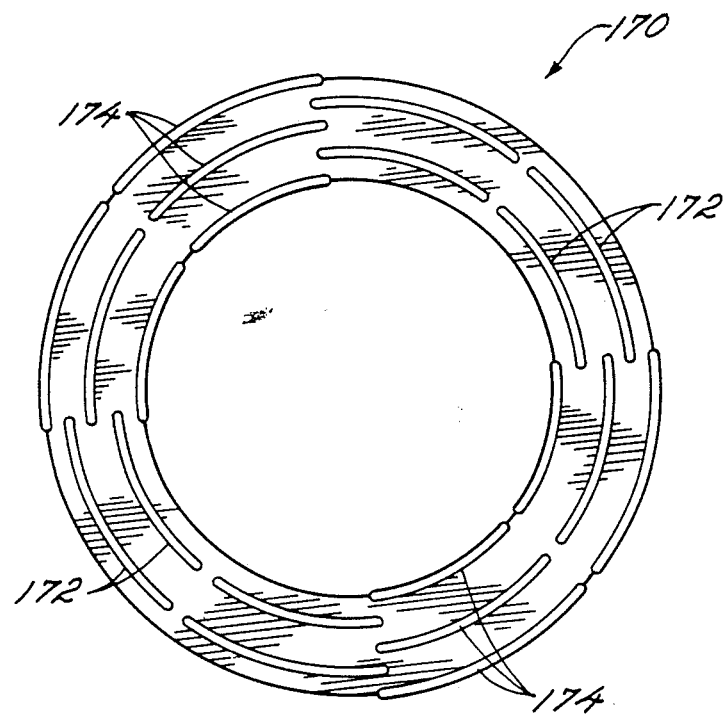
FIG. 12 is a groove pattern for a disc-like member that can be used in a coupling of the type shown in FIG. 1.
Figure 13:
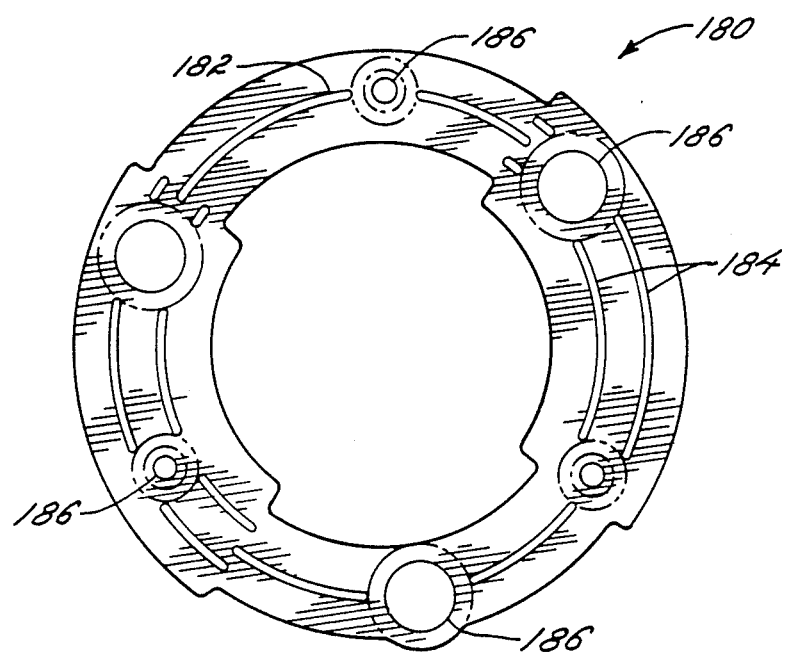
FIG. 13 is an elevational and partially schematic view of a disc-like member that can be used with a disc-like member having the groove pattern of FIG. 12 in a coupling of the type shown in FIG. 1.

FIG. 12 shows a pattern 170 for grooves in a rotor, although the rotor itself is not pictured. Pattern 170 includes, in each of two diametrically opposed quadrants, a pair of grooves 172. The other two diametrically opposed quadrants each include a trio of grooves 174. All grooves are circumferential and subtend an angle of approximately 45 degrees. As in FIG. 10, the pairs of grooves lie at radii that are intermediate to the radii of the trio of grooves 174. Armature 180 shown in FIG. 13 bears the same analogy to the armature of FIG. 11 that the rotor of FIG. 12 bears to the rotor of FIG. 10. Rotor 180 includes in each of two diametrically opposed quadrants a single circumferential groove 182. The other two diametrically opposed quadrants each contain a pair of circumferential grooves 184. The locations of these grooves are chosen so that groove 182, when the armature and rotor are superimposed, lies between the grooves in pair 172. Likewise, the pair of grooves 184 lie between the three grooves in the trio 174. In the armature, several of the grooves are interrupted by mounting holes 186.

Figure 14:
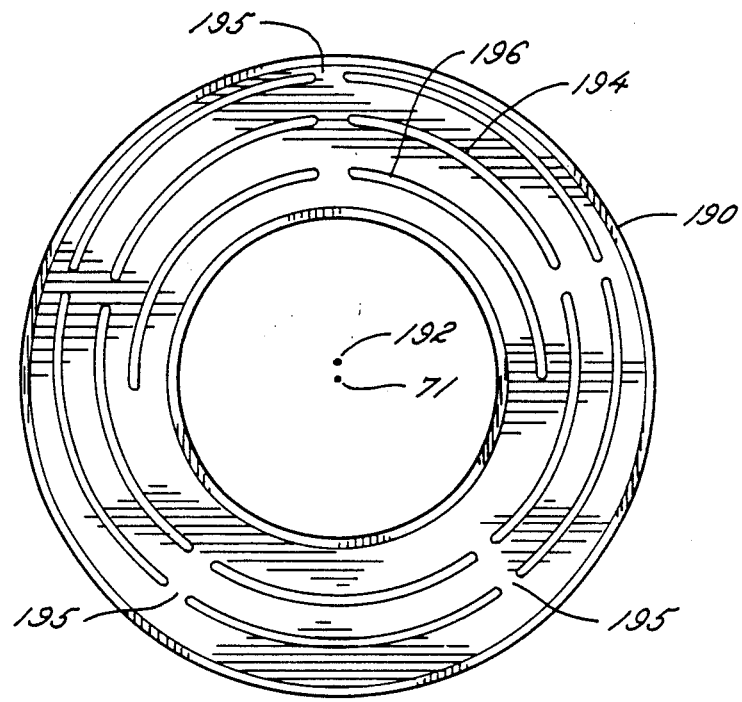
FIGS. 14 and 15 are elevational and partially schematic views of disc-like members that can be used together in a coupling of the type shown in FIG. 1.
Figure 15:
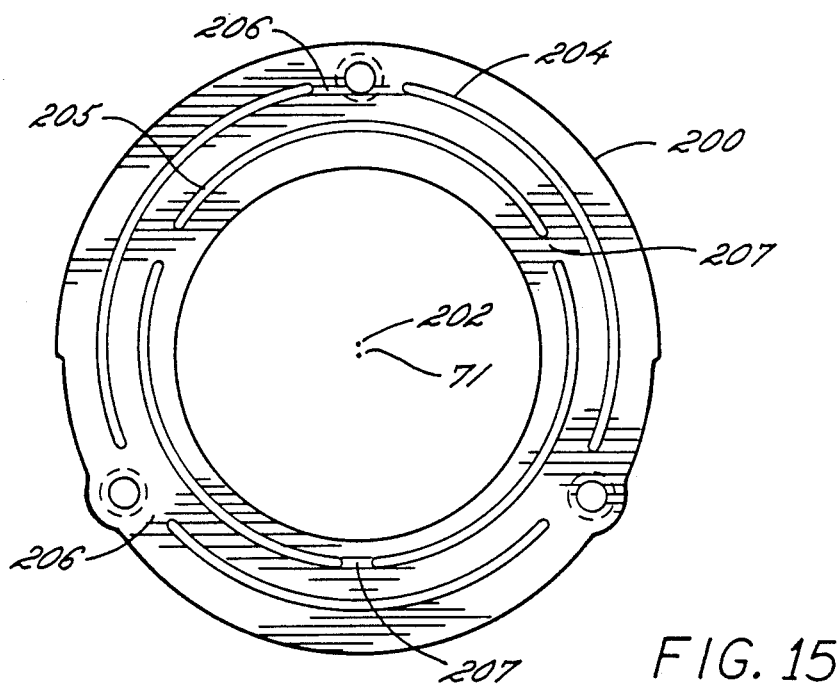

Yet another rotor 190 and armature 200 are shown in FIGS. 14 and 15, respectively. These elements differ substantially from any others in that the centers 192 and 202 of the grooves are offset from the mechanical center 71 of the rotor and armature. Rotor 190 includes a pair of circumferential, concentric grooves 194 that are divided into five segments by intervening radial webs 195 for strength. In addition, a semicircular groove 196, concentric with grooves 194, is divided into two segments. Groove 196 is disposed in rotor 190 in the direction of the offset from mechanical center 71 to groove center 192. Armature 200 includes two off-center concentric, circumferential grooves 204 and 205. Grooves 204 and 205 include three equally spaced webs 206 and 208, respectively, for support. These eccentric grooves are disposed so that when rotor 190 and armature 200 are in phase, grooves 204 lie between grooves 194 and 196.

Figure 16:
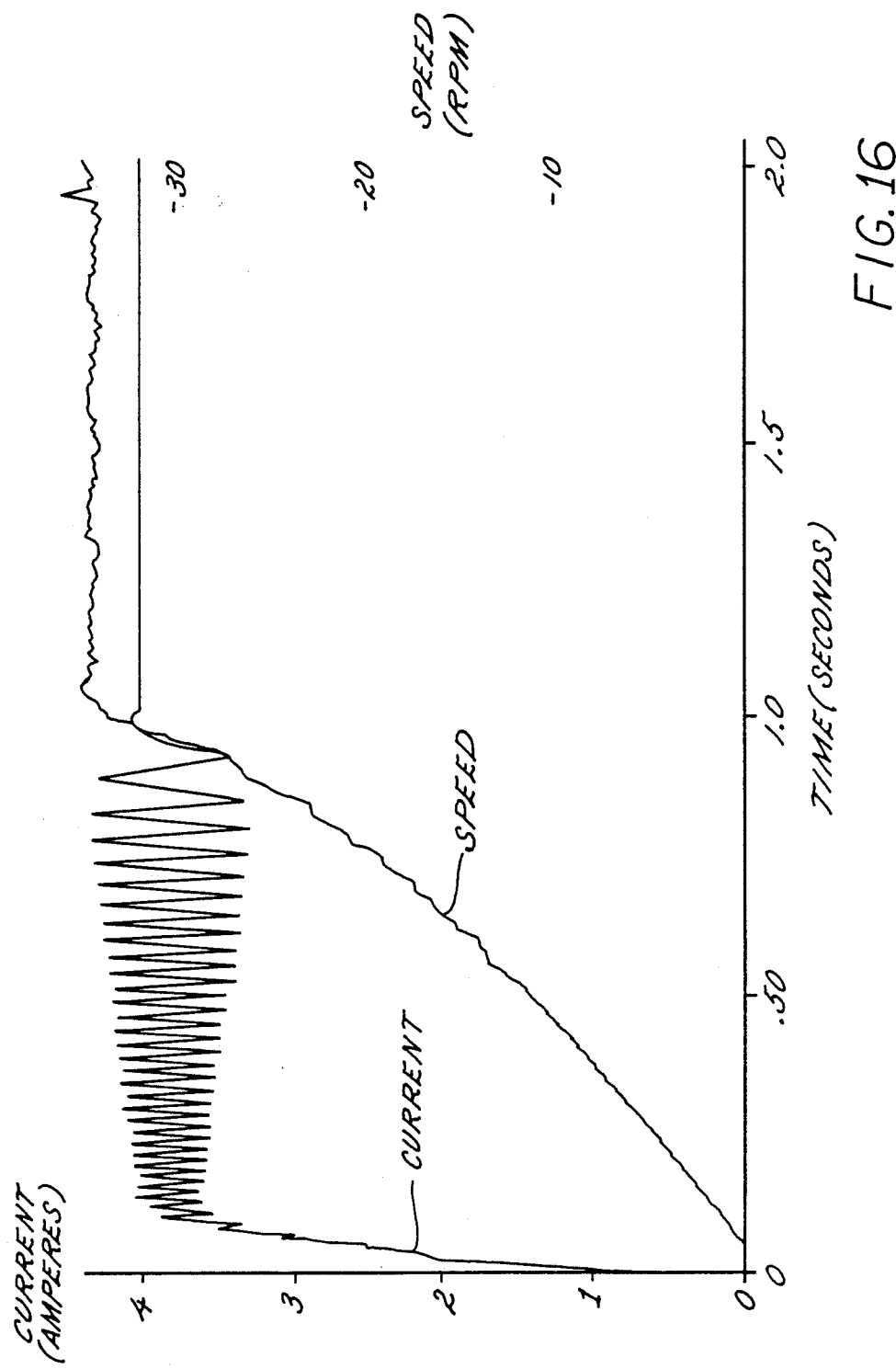
FIG. 16 is a graph of the current flow to the electromagnet of a soft start clutch and of the speed of the clutch as a function of time during initial engagement.

While a number of groove arrangements for a soft start clutch have been illustrated, all generally function in the same way. When the coupling is initially engaged by the energization of winding 34, there is slippage between the rotor and armature. The full speed of the driven accessory is reached gradually. When the full speed is reached, a steady state is established in which no slippage between the rotor and armature takes place. During that initial soft start, the direct current supplied to winding 34 through leads 36 contains an alternating current component or ripple current attributable to the slippage. An example of the variations in the current supplied to winding 34 of the coupling and of the speed of a driven accessory from initial engagement through the steady state is illustrated in the graph of FIG. 16. There, the current flowing through leads 36 is plotted as a function of time with reference to the left ordinate. The speed of the accessory as a function of time is plotted on the right ordinate. The alternating current component in the winding current is readily apparent. The alternating current component has a frequency that is equal to the product of the number of flux increase/decrease cycles per revolution of the discs and the slip frequency of the discs. The alternating current component abruptly ends, at an elapsed time of about one second in FIG. 16, when the steady state is reached and the speed of the driven accessory becomes essentially constant.

Figure 17:
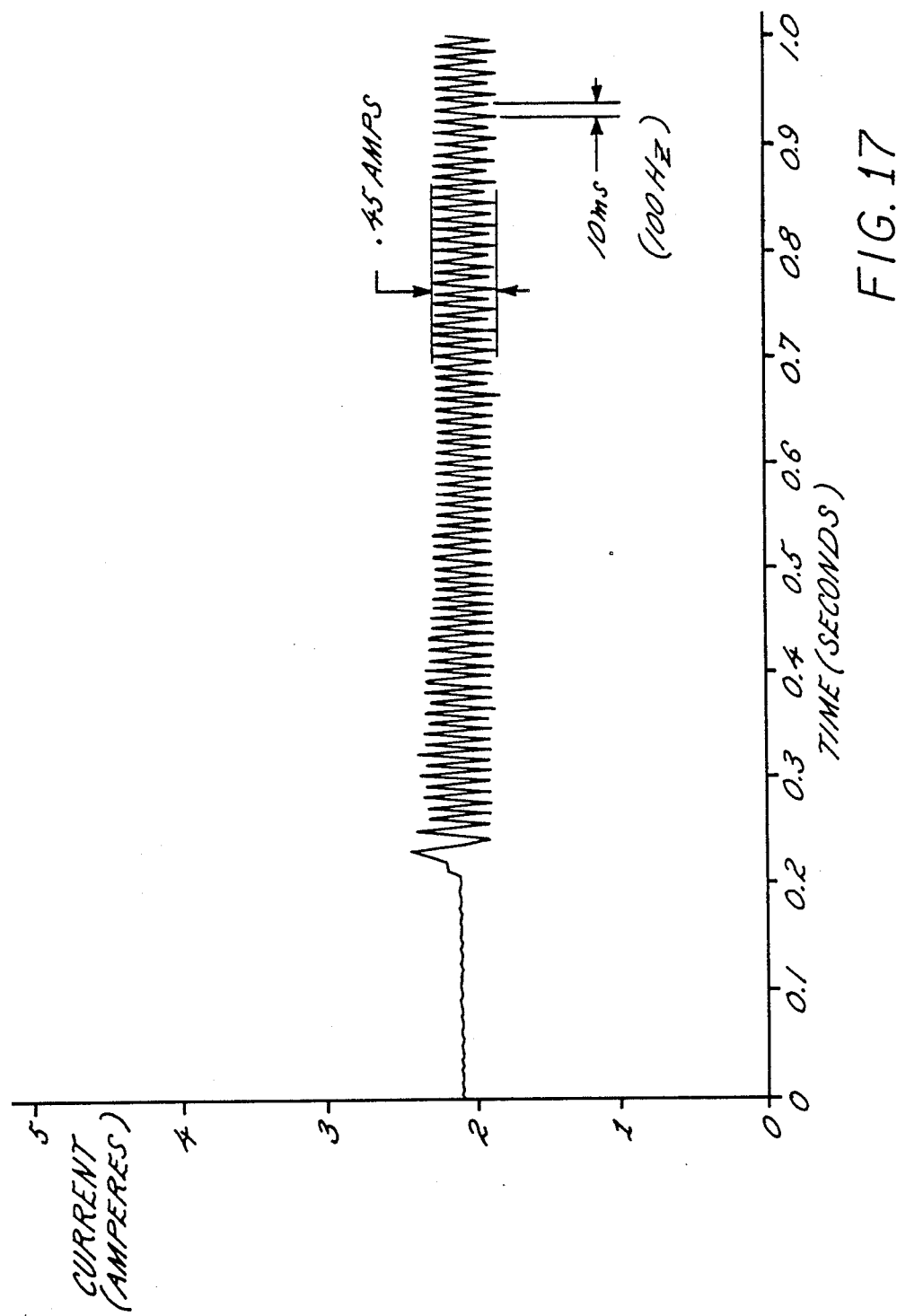
FIGS. 17 and 18 are graphs of examples of the current flow to an electromagnetic clutch before and during slippage.
Figure 18:
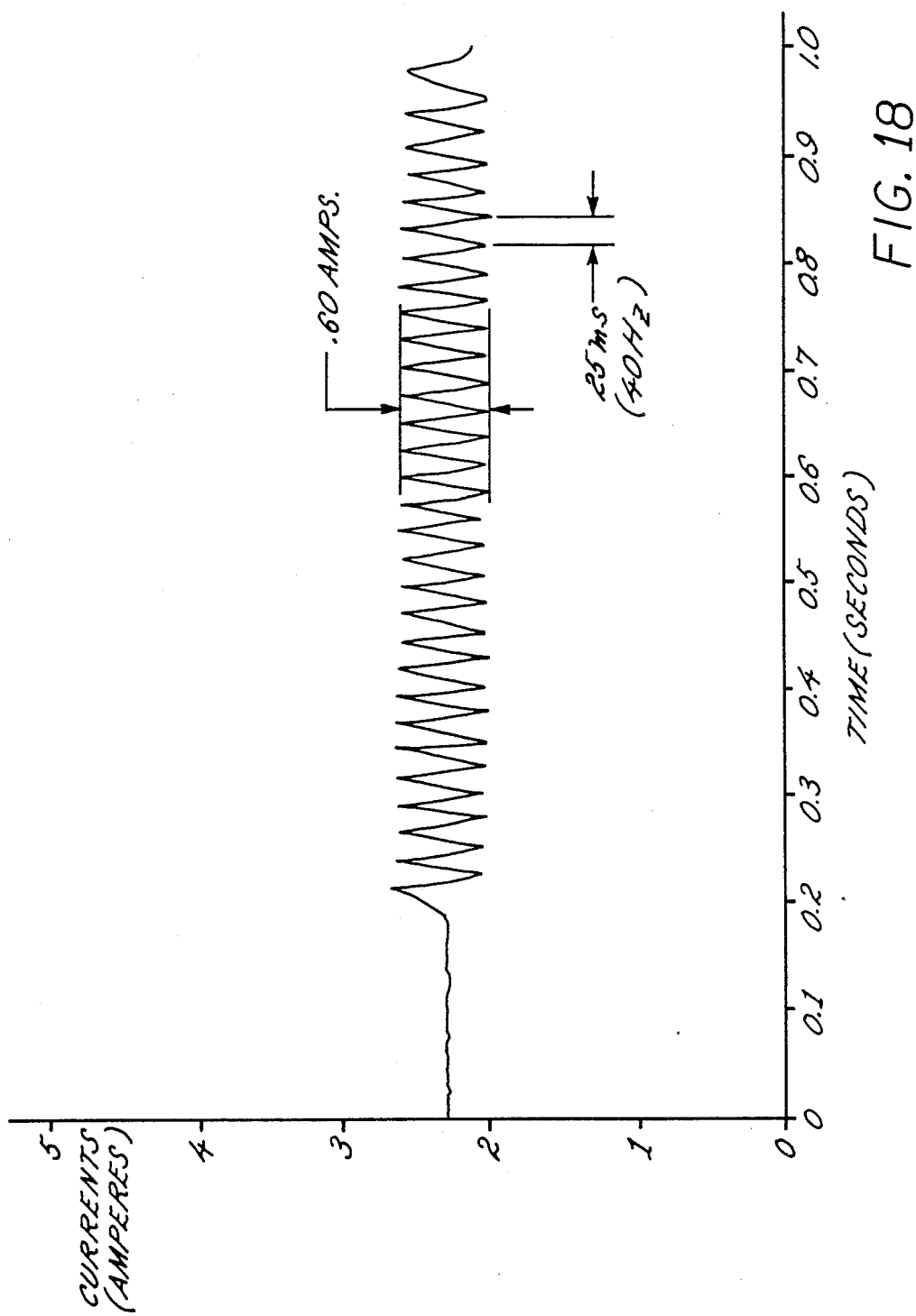

If, after the electromagnetic clutch is engaged, the accessory which it is driving requires greater or lesser torque or freezes or becomes jammed, the torque that must be applied to turn the rotor changes. In turn, slippage again occurs and produces an alternating current component in the current supplied to the winding similar to that shown in FIG. 16. If adequate torque can be supplied by the clutch to reestablish a steady state, constant speed condition, the alternating current component will disappear, just as in the soft start situation. However, if the driven accessory is jammed, slippage will continue as will the generation of the alternating current component. Two examples of the alternating current component signal generated when an accessory driven through an electromagnetic clutch is jammed appear in FIGS. 17 and 18. Those figures show that the alternating current component produced under these circumstances is of significant magnitude and therefore is easily sensed when it appears.

Figure 19:
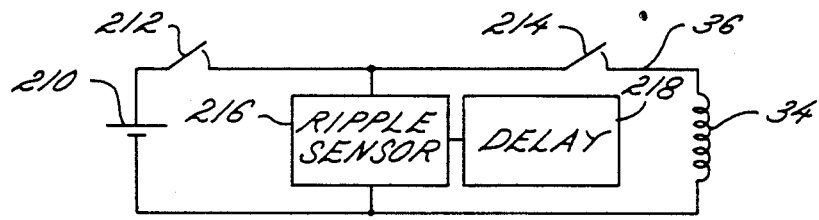
FIG. 19 is a schematic diagram of a portion of apparatus according to an embodiment of the invention.

Generalized circuitry for sensing clutch slippage and responding to the slippage is shown schematically in FIG. 19. There, winding 34 of the electromagnetic clutch is supplied with direct current from a power source 210. The power source is connected through series-connected switches 212 and 214 to leads 36. Switch 212 is a control for the accessory that is driven through the electromagnetic clutch. Switch 212 may be an on-off switch, a thermostat that opens and closes from time to time, or another kind of switch. Switch 214 is a normally closed switch that is opened when slippage is detected in order to avoid damage to the driven accessory, to the belt, and to other accessories that may be driven by the same belt. Switch 214 may automatically close after its opening or it may remain permanently open, like a circuit breaker, after being opened one or more times.

A ripple sensor 216 is connected across electric leads 36 to winding 34. When an alternating current component is detected in the current supplied to winding 34, sensor 26 responds by opening switch 214, thereby interrupting current flow to winding 34. The current interruption disengages the clutch with which winding 34 is associated. Preferably, the responsive signal produced by the sensor is delayed in opening switch 214 by a conventional delay 218. Delay 218 retards the opening of switch 214 and prevents the switch from opening unless the alternating current component persists for a predetermined length of time. The delay permits operation of the sensing circuit during initial engagement of the clutch when the alternating current component is present as shown in FIG. 16. Likewise, the delay prevents opening of switch 214 when an additional load appears, causing temporary slippage of clutch members. In that situation, as in the initial engagement, when a steady state operating speed of the accessory is reached, the slippage ends and the alternating current component disappears. Alternatively, ripple sensor 216 may be disabled during initial engagement and other load changes so that delay 218 can be omitted.

Ripple sensor 216 can be a frequency filter that provides an output signal only when an alternating current signal is present at its input, i.e., across leads 36. For a particular construction of rotor and armature, a fixed range of frequencies for constant slippage indicating a totally jammed or frozen accessory can be determined. In that case, a notch filter sensitive to a limited range of frequencies can be employed to indicate the presence of an alternating current component. Since slippage is only temporary when the load changes, it is unlikely that the steady state, complete slippage frequency will be produced during load changes. Therefore, a notch filter can inherently discriminate between unacceptable slippage when an accessory is frozen and initial engagement or load changes. When that discrimination is available, delay 218 is not necessary since the notch filter output signal will only appear when shaft 28 is blocked.

Figure 20:
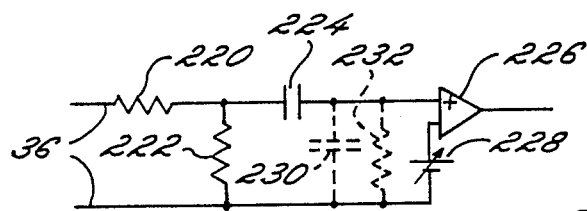
FIGS. 20, 21, and 22 are schematic diagrams of electrical circuitry that may be employed in various embodiments of the invention.

FIG. 20 schematically illustrates a ripple sensor including current limiting resistors 220 and 222 connected across leads 36 to avoid the consumption of excess power. A capacitor 224 is connected from the connection of resistors 220 and 222 to an input terminal of a comparator 226. Capacitor 224 is a high pass filter that passes alternating current signals from leads 36 to comparator 226 while blocking the direct current. Comparator 226 generates an output signal when the input signal from capacitor 224 exceeds a threshold voltage established by a variable voltage power supply 228. Comparator 226 is useful for preventing the interpretation of transients as alternating current components indicating slippage. Comparator 226 also provides a degree of isolation for ripple sensor 216 and assures the generation of a recognizable signal when an alternating current component is produced by slippage. Comparator 226 inherently incorporates some limited time delay. Additional delay can be achieved by employing a parallel-connected capacitor 230 and resistor 232 across the input terminals of comparator 226. Capacitor 230 gradually charges as an alternating current component passes through capacitor 224. Resistor 232 is preferably of a high value and gradually bleeds charge from capacitor 230. Capacitor 230 integrates an alternating current component signal. If that signal persists, capacitor 230 charges to a sufficient value to change the output state of comparator 226 which, in turn, opens switch 214. If the alternating current component is present for a relatively short time, capacitor 230 is not charged to a voltage sufficient to trigger comparator 226. In that case, resistor 232 gradually reduces the voltage across capacitor 230 so that unrelated, successive alternating current components are not combined to trigger comparator 226.

Figure 21:
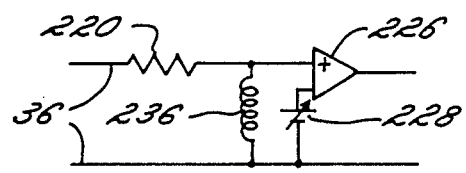

An alternative frequency filter is shown in FIG. 21. In place of resistor 222 and capacitor 224, an inductor 236 is connected from resistor 220 and an input terminal of comparator 226 to ground. Inductor 236 resists the flow of alternating current, but passes direct current with little loss. As a result, any alternating current component that is present appears across the inductor and is directed to the input terminal of comparator 226. Because the frequency of an alternating current component generated by slippage is usually relatively low, capacitor 224 in FIG. 20 must be relatively large in order to be effective. The filter of FIG. 21 overcomes the difficulty of using a large capacitor by employing inductor 236. An inductor having the necessary inductance may be more easily realized than a capacitor 224 of sufficient capacitance. Although not shown in FIG. 21, capacitor 230 and resistor 232, the delay circuitry components of FIG. 20, can be added to the circuitry of FIG. 21 if desired.

Figure 22:
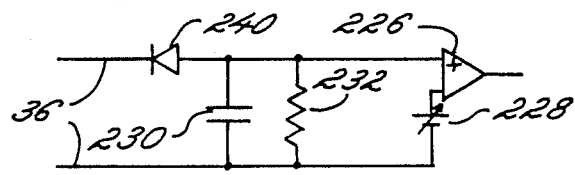

FIG. 22 shows still another ripple sensor embodiment. That embodiment includes a diode 240 that blocks the flow of the direct current that is employed to energize winding 34. Diode 240 allows a portion of any alternating current component on leads 36 to pass so that switch 214 may be opened when slippage is indicated. Although not necessary to implementation of this embodiment, FIG. 22 shows a delay circuit comprising parallel-connected capacitor 230 and resistor 232 as well as a comparator 226 with a variable voltage threshold power supply 228 as already described with reference to other figures. The rectifying means sensor embodiment of FIG. 22 is particularly advantageous since it is relatively free of frequency dependence and no large value capacitor or inductor is needed, making it relatively inexpensive. Still other filtering, sensor, and delay means embodiments may be employed in the invention to assure that the electromagnetic coupling is timely disengaged from the shaft of an accessory that freezes, is blocked, or experiences a load increase to a burden that is more than can be driven by the coupling.

I claim:
1. A soft start electromagnetic clutch including first means for engaging driving and driven members of said clutch in response to the flow of a direct electrical current to said clutch, second means for initiating slippage between said driving and driven members after the engagement which dissipates in time, and third means for monitoring the current flow and for detecting the presence of an alternating current component in said direct electrical current whereby slippage in said clutch is indicated.

2. The electromagnetic clutch of claim 1 wherein said driving and driven members are made of a low reluctance magnetic material and are supported in face-to-face relation to rotate about a predetermined axis, said driving member normally being spaced axially from and being rotatable relative to said driven member, means operable by the flow of said current to create a magnetic flux that attracts said members axially into engagement to cause said driving member to rotate said driven member, each member including at least partially circumferential regions of relatively high magnetic reluctance located such that radial alignment between the high reluctance regions of said driving member and of said driven member varies when said members are in different angular positions relative to each other.

3. The electromagnetic clutch of claim 1 wherein said third means for monitoring comprises means for frequency filtering said direct electrical current to detect the presence of an alternating current component.

4. The electromagnetic clutch of claim 3 wherein said means for frequency filtering comprises a notch filter.

5. The electromagnetic clutch of claim 3 wherein said means for frequency filtering comprises a high pass filter.

6. The electromagnetic clutch of claim 1 wherein said third means for monitoring comprises a rectifier for blocking direct current components of said electrical current and for passing at least a portion of any alternating current component of said direct electrical current.

7. The electromagnetic clutch of claim 1 including means for interrupting the flow of said direct electrical current when an alternating current component is detected.

8. The electromagnetic clutch of claim 7 including means for delaying operation of said means for interrupting until said alternating current component persists for a predetermined length of time.

9. The electromagnetic clutch of claim 1 including means for comparing a detected alternating current component to a predetermined threshold and means for interrupting the flow of said direct electrical current when said alternating current component exceeds said threshold.

10. The electromagnetic clutch of claim 9 including means for delaying operation of said means for interrupting the flow of said current until said detected alternating current component exceeds said threshold for a predetermined length of time.

11. A slippage-indicating electromagnetic coupling comprising first and second discs disposed in face-to-face relation, said first disc being rotatable relative to said second disc about a common axis, each disc having at least partially circumferential high reluctance regions such that the radial alignment between high reluctance regions of said discs varies with the relative angular positions of said discs, means for generating a magnetic flux in response to the flow of a direct electrical current for coupling said first disc to said second disc, and means for detecting the presence of an alternating current component in said direct electrical current, means for comparing a detected alternating current component to a predetermined threshold and means for interrupting the flow of said direct electrical current when said alternating current component exceeds said threshold.

12. The electromagnetic coupling of claim 11 wherein said means for detecting comprises means for frequency filtering said direct electrical current to detect the presence of an alternating current component.

13. The electromagnetic coupling of claim 12 wherein said means for frequency filtering comprises a notch filter.

14. The electromagnetic coupling of claim 12 wherein said means for frequency filtering comprises a high pass filter.

15. The electromagnetic coupling of claim 11 wherein said means for monitoring comprises a rectifier for blocking direct current components of said direct electrical current and for passing at least a portion of any alternating current component of said direct electrical current.

16. The electromagnetic coupling of claim 11 including means for delaying operation of said means for interrupting the flow of said direct electrical current until said detected alternating current component exceeds said threshold for a predetermined length of time.

17. A method of sensing slippage in a soft start electromagnetic clutch of the type that gradually mechanically engages in response to the flow of a direct current electrical current to said clutch, said clutch slipping during said gradual mechanical engagement, comprising monitoring the direct electrical current applied to said clutch to detect the presence of an alternating current component and indicating slippage in said clutch when an alternating current component is present.

18. The method of claim 17 including frequency filtering said monitored direct electrical current to detect the presence of an alternating current component.

19. The method of claim 17 including rectifying said monitored direct electrical current to detect the presence of an alternating current component.

20. The method of claim 17 including interrupting the flow of said direct electrical current when an alternating current component is detected.

21. The method of claim 20 including delaying interruption of the flow of said direct electrical current until the detected alternating current component persists for a predetermined length of time.

22. The method of claim 17 including comparing a detected alternating current component to a predetermined threshold and interrupting the flow of said direct electrical current when the alternating current component exceeds said threshold.

23. The method of claim 22 including delaying interruption of the flow of said direct electrical current until the detected alternating current component exceeding said threshold persists for a predetermined length of time.

* * * * *